United States Patent [19]

Castelli

[11] Patent Number: 4,897,206

[45] Date of Patent: Jan. 30, 1990

[54] BIDIRECTIONALLY CORRUGATED PLATE SEPARATOR FOR FLUID MIXTURES

[75] Inventor: Joseph L. Castelli, Radnor, Pa.

[73] Assignee: Facet Quantek, Inc., Tulsa, Okla.

[21] Appl. No.: 278,000

[22] Filed: Nov. 30, 1988

[51] Int. Cl.[4] ............................................. B01D 23/24
[52] U.S. Cl. ................................... 210/791; 210/522; 210/799; 210/487; 210/488; 210/232; 210/498; 210/357; 210/DIG. 5; 55/257.2; 55/257.3; 55/257.6
[58] Field of Search ............... 210/791, 799, 232, 521, 210/522, 498, 487, 488, 357, DIG. 5; 55/257.2, 257.3, 257.6; 134/30, 25.4

[56] References Cited

U.S. PATENT DOCUMENTS

| | | | |
|---|---|---|---|
| 3,348,466 | 10/1967 | Lane et al. | 55/257.2 |
| 3,385,439 | 5/1968 | Bach | 210/522 |
| 3,741,401 | 6/1973 | Hsiung | 210/521 |
| 3,847,813 | 11/1974 | Castelli . | |
| 3,898,164 | 8/1975 | Hsiung | 210/521 |
| 3,957,656 | 5/1978 | Castelli . | |
| 4,053,292 | 10/1977 | Schneider et al. | 55/257.2 |
| 4,122,017 | 10/1978 | Tanabe et al. | 210/522 |
| 4,133,758 | 1/1979 | Davis et al. | 210/522 |
| 4,278,545 | 7/1981 | Batutis et al. . | |
| 4,299,706 | 11/1981 | Smith . | |
| 4,337,561 | 7/1982 | James | 210/521 |
| 4,361,426 | 11/1982 | Carter et al. | 55/257.2 |
| 4,389,315 | 6/1983 | Crocket | 210/357 |
| 4,405,459 | 9/1983 | Smith . | |
| 4,410,427 | 10/1983 | Wydeven | 210/487 |
| 4,437,988 | 3/1984 | James | 210/521 |
| 4,526,691 | 7/1985 | Melis et al. | 210/521 |
| 4,589,983 | 5/1986 | Wydeven | 210/487 |

Primary Examiner—Richard V. Fisher
Assistant Examiner—Cynthia L. Nessler
Attorney, Agent, or Firm—Fish & Richardson

[57] ABSTRACT

The coalescing plate is designed to separate immiscible components of differing densities mixed in a fluid. The plate includes bidirectional corrugations forming crests and valleys. Bleed holes are provided in the crests and valleys to allow the immiscible components to pass through. Plural plates are stacked and separated by spacers. The spacers are configured to provide multiple spacings between adjacent plates. The immiscible components less dense than the host fluid migrate upwardly and pass through the bleed holes in the crests. Solids and other components denser than the host fluid move downwardly and pass through the bleed holes in the valleys. The plates are readily cleaned in situ by passing a nozzle through the bleed holes nad introducing a pressurized fluid or gas to flush out the space between the plates.

21 Claims, 2 Drawing Sheets

BIDIRECTIONALLY CORRUGATED PLATE SEPARATOR FOR FLUID MIXTURES

BACKGROUND OF THE INVENTION

This invention relates to apparatus for separating immiscible components of different densities mixed in a fluid.

It is often necessary to separate immiscible components, including solids, mixed in a fluid. An example is the separation of oil and oily solids mixed with water. Before the water can be discharged, the oily components must be separated and removed.

Plate separators are known which include undulating or corrugated plates stacked in a spaced apart configuration to effect separation. See, for example, U.S. Pat. Nos. 3,847,813; 3,957,656; 4,278,545, and 4,299,706. In all of these separators, substances such as oil which are less dense than a host fluid such as water migrate upwardly while denser components such as solids drift downwardly. In the configuration shown in U.S. Pat. No. 4,278,545, lighter components such as oil pass heavier solid components after they have reached the separator plate surfaces. In passing, the components often mix once again diminishing the efficiency of the separator. Furthermore, sludge may form which clogs the spaces between the plates.

SUMMARY OF THE INVENTION

A coalescing plate according to the invention has bidirectional corrugations forming crests and valleys in two directions. The crests and valleys include bleed holes for passage therethrough of immiscible components mixed with a host fluid. Multiple plates may be stacked with spaces between plates maintained by spacers. In a preferred embodiment, the spacers include asymmetrically located multistep projections and asymmetrically located internal passages adapted for mating with identical spacers such that a 180° rotation of one plate results in a different separation from an adjacent plate.

In this embodiment the bidirectional corrugations are orthogonal to one another and approximately sinusoidal. Generally, the wavelength of corrugations in one direction is greater than the wavelength of the corrugations in the other direction, and it is preferred that the direction of fluid flow be parallel to the corrugations formed by the longer wavelength. Lugs which are removably attached to the lowermost spacer projections are used to provide additional separation between adjacent plates. Plate separation may also be varied in the direction of fluid flow.

The separator plates of the present invention are readily cleaned in situ by introducing a nozzle through the bleed holes in the plate and into the space between adjacent plates. The nozzles are configured to spray fluid substantially parallel to the plate surfaces for effective cleaning.

The present invention affords numerous advantages over known separators. First of all there is no intermingling of the components after they reach the plate surfaces unlike the configuration in U.S. Pat. No. 4,278,545. Furthermore, the bidirectional corrugations, which run both laterally and longitudinally along the single plane of the plate, provide ramps up which the lighter components travel to the upper bleed holes and down which solid and other denser components travel to the bleed holes in the valleys. The bidirectional undulation results in much more surface or collection area per linear dimension of a separator unit.

Variable spacing between adjacent plates is readily achieved by rotating a plate 180°. Increased spacing is achieved by utilizing additional spacers. Spacing within a separator unit can be varied in the direction of fluid flow to accommodate changes in the mixture composition as the fluid passes through the separator.

The bidirectional corrugations provide stiffness in two directions thereby requiring fewer supports between adjacent plates. Furthermore, the ramps formed by the corrugations result in shorter collection paths than in known configurations.

Ease of cleaning the separator stack is another important advantage of the present invention. Prior configurations often had to be disassembled in order to clean them properly. The instant invention allows the stack to be cleaned without disassembly.

DESCRIPTION OF THE PREFERRED EMBODIMENT

Figure 1:
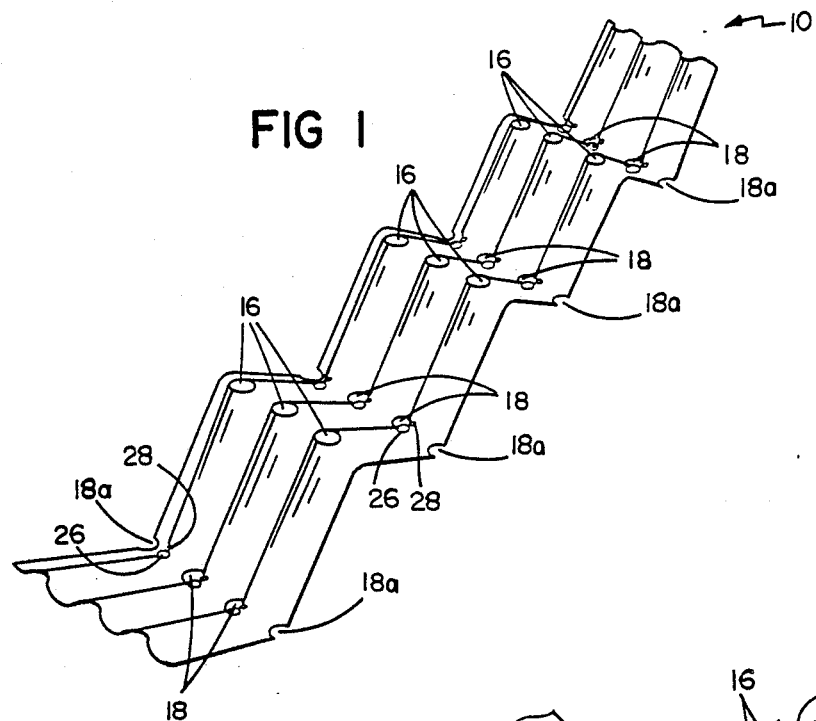
FIG. 1 is a perspective view of a separator plate according to the invention.
Figure 2:
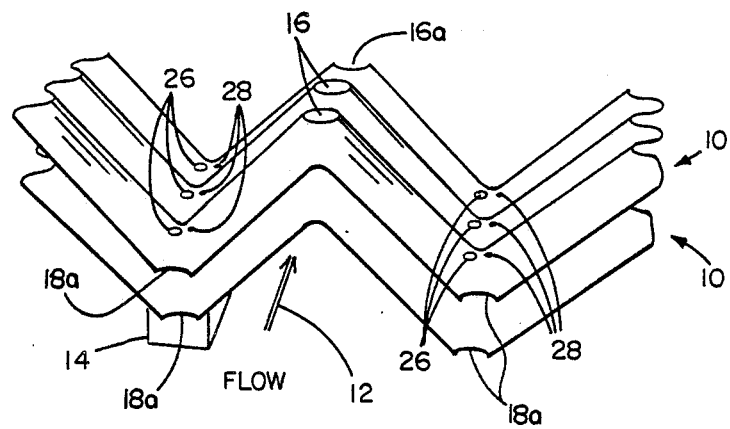
FIG. 2 is a perspective view of a pair of stacked separator plates.

As shown in FIG. 1 a corrugated separator plate 10 has corrugations running in orthogonal directions. The plate 10 may be made of injection moldable plastic or other suitable material including electrically conductive and non-conductive materials. The surfaces may be embossed and/or coated with appropriate materials to enhance the separation and removal process. The plates 10 may be stacked in a spaced relationship as shown in FIG. 2. The direction of fluid flow is indicated by an arrow 12. A trough 14 may be located beneath the valley in the plate 10 to catch solid materials.

Figure 5:
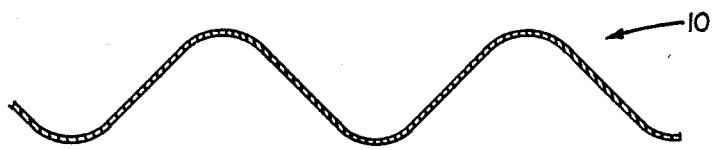
FIG. 5 is a cross sectional view of the separator plate along section line 5—5 of FIG. 4.
Figure 3:
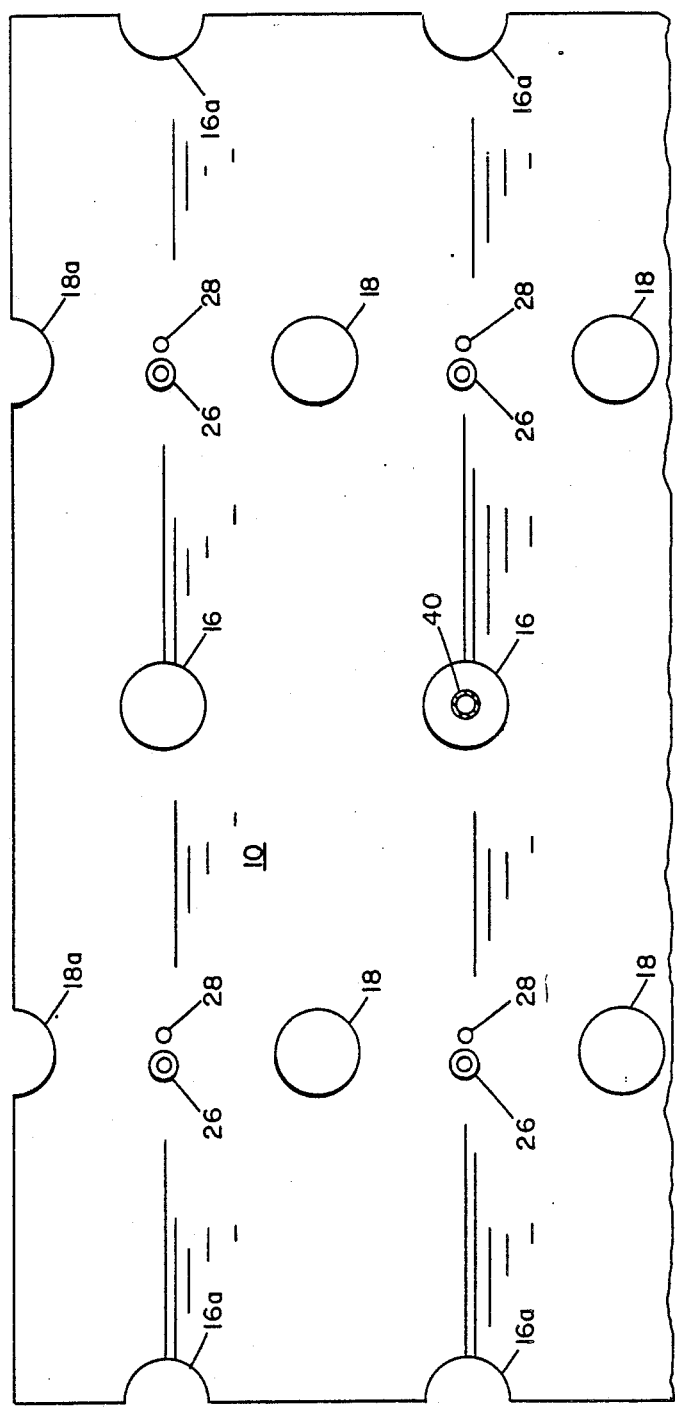
FIG. 3 is a plan view of a separator plate.
Figure 4:
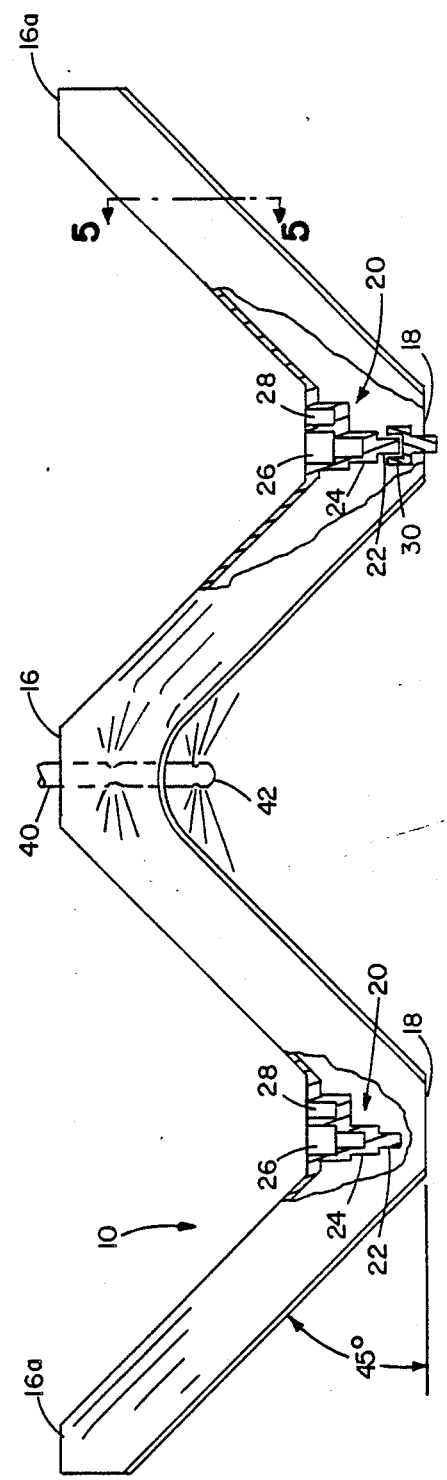
FIG. 4 is an elevation view of a separator plate.

The separator plate 10 will now be described in detail with reference to FIGS. 1, 3, 4 and 5. Bleed holes 16 are provided in the crests of the corrugations and bleed holes 18 are provided in the valleys. A suitable diameter for bleed holes 16 and 18 is three-quarters of an inch but the diameter may be varied to suit individual requirements. Note that at the edges there are semicircular openings 16a and 18a which form bleed holes when combined with additional separator plates. As shown in FIGS. 4 and 5, the corrugations in the orthogonal directions are made up with 45° segments, but the angle can be varied to suit individual requirements.

An important aspect of the present invention will now be described in conjunction with FIG. 4. Spacers 20 which may be molded integrally with the plate 10 include multistep projections 22 and 24 which are asymmetrically located with respect to a centerline of the spacer 20. The spacers 20 also include internal passages 26 and 28 which are also asymmetrically located with respect to the centerline of the spacer 20. With this spacer configuration, when the uppermost plate 10 in FIG. 2 is lifted, rotated 180°, and then stacked on the lower plate, the spacing between the two plates will be altered because of different points of engagement. When conditions demand, additional space between the plates 10 can be obtained by utilizing a removable spacer 30 which can be snapped onto the projection 22 of the integral spacer 20. The spacer 20, which can be of a different material from that of the plate 10, can be fabricated separately and inserted into the plate.

Although the dimensions of the separator plate 10 are not critical, a convenient size has a length of two feet and a width of one foot with three-quarter inch diameter bleed holes. Because of the semicircular openings 16a and 18a at the edges, multiple plates can be abutted to form large separator areas while maintaining the bleed hole pattern. In the exemplary embodiment illustrated in the figures, the distance between the crests and valleys for one corrugation direction is six inches and approximately 2⅜ inches for the corrugations running in the other direction.

In operation, a stack of separator plates 10 is immersed in a fluid flowing in the direction shown in FIG. 2. Suppose, for example, that the host fluid is water mixed with oil and solid material. As the mixture flows past the plate surfaces, the lighter oil will coalesce and migrate up ramps created by the corrugations and pass through the bleed holes 16 for collection. In a corresponding fashion, solids and other components denser than water will migrate downwardly and pass through bleed holes 18 and be collected in the trough 14. Once the components reach the respective plate 10 surfaces, they do not substantially intermingle which would diminish the efficiency of the separator. If the stack of separator plates is turned upside down, the same function will be performed; the bleed holes 16 will now collect the heavier components and bleed holes 18 the lighter components. It may be desirable to decrease the spacing between the plates 10 as the fluid moves downstream as conditions within the mixture will change.

As stated above, the invention permits cleaning without having to remove the plates. As shown in FIG. 4, cleaning is effected by passing a tube 40 through one of the bleed holes such as the bleed hole 16 in a crest. The tip of the tube 40 includes a nozzle portion 42 which directs a pressurized fluid or gas spray downwardly as shown. This downward spray is effective in cleaning the downwardly sloping surfaces. Similarly, a tube 40 may be passed through a bleed hole in a valley and include a nozzle adapted to spray pressurized fluid or gas upwardly to clean upward sloping surfaces. Cleaning can be performed with a ganged set of tubes wherein multiple bleed holes are used. A suitable cleaning fluid may be a solvent or the host fluid such as water; a suitable pressurized gas is pressurized air. Cleaning can also be performed by permanently installing nozzles or perforated tubes in the bleed holes. Pressurized fluid or gas is then forced through the tubes for cleaning. The fixed tubes can also be used for injecting materials into the plate channels to facilitate separation.

What is claimed is:

1. A coalescing plate for separating immiscible components of differing densities in a fluid, the plate having bidirectional corrugations, running both laterally and longitudinally along the single plane of the plate, forming crests and valleys, the crests and valleys including bleed holes for passage of the immiscible components.

2. The coalescing plate of claim 1 wherein the bidirectional corrugations are oriented orthogonally to one another 3. The coalescing plate of claim 1 wherein the corrugations are approximately sinusoidal.

4. The coalescing plate of claim 1 wherein the corrugation cross sections include 45° angles.

5. The coalescing plate of claim 1 further including spacers to separate the plate from an adjacent similar plate.

6. The coalescing plate of claim 5 wherein each of the spacers includes asymmetrically located multistep projections and asymmetrically located internal passages adapted for mating with a similar spacer, whereby a 180° rotation of the plate results in a different separation from a similar plate.

7. The coalescing plate of claim 6 further including a lug removably attached to the lowermost spacer projection to provide additional separation between adjacent plates.

8. Apparatus for separating immiscible components of different densities in a horizontally flowing fluid comprising a plurality of horizontally disposed, spaced coalescing plates, each of the plates having bidirectional corrugations, running both laterally and longitudinally along the single plane of the plate, forming crests and valleys, the crests and valleys including bleed holes for passage of the immiscible components.

9. The apparatus of claim 8 wherein the wavelength of the corrugations in one direction is greater than the wavelength of the corrugations in the other direction, and wherein the direction of the fluid flow is parallel to the corrugations formed by either the longer or the shorter wavelength.

10. The apparatus of claim 8 wherein the corrugation cross section of each of the plates includes 45° angles.

11. The apparatus of claim 8 wherein the plurality of spaced coalescing plates is invertible.

12. The apparatus of claim 8 wherein the separation between plates varies in the direction of fluid flow.

13. The apparatus of claim 8 further including troughs under the bleed holes in the valleys to collect solids and other components denser than the fluid stream.

14. The apparatus of claim 8 wherein each of the plates includes spacers to separate the plate from adjacent plates.

15. The apparatus of claim 14 wherein each of the spacers includes asymmetrically located multistep projections and asymmetrically located internal passages adapted for mating with a similar spacer, whereby a 180° rotation of the plate results in a different separation from an adjacent plate.

16. The apparatus of claim 15 further including a lug removably attached to the lowermost spacer projection to provide additional separation between adjacent plates.

17. In apparatus for separating immiscible components of different densities in a horizontally flowing fluid comprising a plurality of horizontally disposed, spaced coalescing plates, each of the plates having bidirectional corrugations, running both laterally and longitudinally along the single plane of the plate, forming crests and valleys, the crests and valleys including bleed holes for passage of the immiscible components,
the method of cleaning the plates in situ comprising:
passing a nozzle sequentially through the bleed holes in the plate and into the space between adjacent plates; and
passing a pressurized fluid or gas through the nozzle.

18. The method of claim 17 wherein the nozzle is adapted to direct the pressurized fluid or gas along the corrugations.

19. The method of claim 17 wherein the pressurized fluid is water.

20. The method of claim 17 wherein the pressurized fluid is a solvent.

21. The method of claim 17 wherein the pressurized gas is air.

* * * * *